United States Patent [19]

Parker

[11] 4,400,861
[45] Aug. 30, 1983

[54] FABRICATION OF SEISMIC SPRINGS FROM SHEETS

[75] Inventor: Carl E. Parker, Cypress, Tex.

[73] Assignee: OYO Instruments, Inc., Houston, Tex.

[21] Appl. No.: 325,138

[22] Filed: Nov. 27, 1981

[51] Int. Cl.³ ............................................. B21F 35/00
[52] U.S. Cl. .................................. 29/173; 29/602 A; 267/158; 267/161
[58] Field of Search ................... 29/527.2, 527.4, 173, 29/602, 602 A; 148/131, 132; 267/158, 161, 163

[56] References Cited

U.S. PATENT DOCUMENTS 2,604,316  7/1952  O'Brien et al. ...................... 29/173
3,239,804  3/1966  Elskamp et al. .................... 267/161
4,323,994  4/1982  Coogler ............................. 267/161

*Primary Examiner*—Francis S. Husar
*Assistant Examiner*—David B. Jones
*Attorney, Agent, or Firm*—Michael P. Breston

[57] ABSTRACT

In accordance with the method of this invention, at least one sheet containing the spider springs is positioned in a novel preform fixture having internal parts constructed to simultaneously permanently preform each spring after the fixture is heat treated. The novel fixture for carrying out the preforming process of the invention on an etched sheet comprises a base plate having a number of columns extending vertically upwardly from the flat surface. The number of columns is equal to the number of springs on the sheet, and their disposition on the base corresponds to the disposition of the inner rings on the sheet. The outside diameter of a column is substantially equal to the outside diameter of an inner ring. An intermediate plate is provided defining a number of transverse bores equal to the number of columns. The diameter of each bore is substantially equal to the inside diameter of each outer ring so that the center of each column is also the center of each bore when the bottom surface of the intermediate plate is disposed on top of the base plate. A compression plate is disposed over the intermediate plate.

6 Claims, 7 Drawing Figures

FABRICATION OF SEISMIC SPRINGS FROM SHEETS

BACKGROUND OF THE INVENTION

1. Field of the Invention

This invention relates to spider springs for seismometers and the like, and more particularly to a method and apparatus for mass producing such springs while they remain attached to their sheets from which they have been etched out.

2. Description of the Prior Art

Seismometers or geophones of the type to which this invention relates has a coil-mass assembly and a permanent magnet assembly that are adapted to move relative to each other in response to earth vibrations. One assembly is stationary and is in engagement with and moved by the earth. The second assembly is supported from springs and, due to inertia, lags behind the movement of the first assembly. The coil assembly produces an output electric signal which is proportional to the earth's vibrations.

The springs used in geophones of the type to which this invention relates are known in the art as "spider" springs. Geophones utilizing spider springs are described in the patent literature, see for example, U.S. Pat. Nos. 2,754,435, 3,157,852, 3,239,804, 3,258,742, 3,344,397, 3,451,040 and 3,718,900.

These spider springs are etched out from very thin flat sheets typically made of a beryllium copper alloy having a thickness of about 4 mils. Most digital grade geophones 8 Hz. and higher now utilize double-ended, cantilever spider springs consisting of an inner ring, an outer ring, and a plurality of double-ended arms interconnecting the rings. Each sheet of copper is typically rectangular and the circular springs are etched out in rows. After etching, the springs are still held together by tie tabs to facilitate severing the springs from the sheet. There are a plurality of rows and each row includes a plurality of springs. After the individual springs are severed from a very thin copper sheet which has not yet been heat treated, they are very fragile. Hand manipulations of their rings and especially their arms are likely to cause considerable damage to their shapes.

In each such spring there is a need to displace the inner ring relative to the outer ring in an axial direction. Creating such a displacement, known in the art as a "preform", requires a preform fixture. The present practice involves stacking in the fixture the individual springs severed from the sheet, one on top of the other, with their arms properly oriented relative to each other. The lesser the number of springs in the stack, the better their preforming will be. On the other hand, the greater the number of springs is in the stack, the faster the preforming operation becomes. Loading between 10 to 15 individual springs into the preform fixture, can provide springs with an acceptable preform.

The inner parts of the preforming fixture are so structured that when it is closed, all the inner rings of the springs become positioned relative to their outer rings by substantially the same displacement. The closed fixture together with its springs are then heated in an oven or in a hot salt bath for about 1 to 2 hours at a temperature of about 600° F., and then the hot fixture is plunged into a quench bath to temper the springs. This heat treatment of the individual springs in the fixture hardens the springs, as is well known in the art of heat treating. When the fixture is opened and the individual springs are manually carefully removed therefrom, to avoid their arms from becoming entangled, each spring is permanently preformed so that its inner ring is axially displaced from its outer ring by a desired distance, when the spring is in a free condition.

The drawbacks of the above described preforming process are well known. It is relatively slow because it requires for the individual springs to be stacked, one on top of the other, in the preform fixture with the spring arms being properly oriented relative to each other. Such stacking of the fragile springs while they are in their non-heat treated state, requires considerable time and care. Any excessive twisting of the spring arms can produce unpredictable and undesirable output signals from the geophones utilizing them. This is so because the arms of the springs will flex unexpectedly. It may be anticipated that between 15% to 25% of the springs will become damaged during the present preforming process, either while loading the individual springs into the preform fixture, or while separating the individual springs from the fixture after the heat-treating-and-preforming process has been completed.

For that reason it is very important that the springs be individually graded and measured. If the springs are spot checked at random, defective springs will be discovered only after they have been assembled into the geophones. It can be expected that the distortions in the output signals from such defective geophones will fall outside of the prescribed tolerance limits. Manually grading the individual springs is another very time-consuming operation.

In certain types of geophones, the springs in addition to serving as a suspension system between the coil-mass assembly and the permanent magnet assembly, also serve as current conductors. In that case, it may be desired to plate each spring with a good conductive material, such as gold, silver or rhodium. This is accomplished by loading the preformed individual springs into a plating rack, which again is a time-consuming operation.

It is a general object of the present invention to greatly simplify the present preforming process for making spider springs. This is generally accomplished by eliminating most of the presently required hand manipulations especially while the springs are in their non-heat treated state. As a result, the percentage of deformed springs obtained with the invention is relatively small compared to the number of defective springs resulting from the presently utilized preforming process.

It is a further object of the invention to greatly increase the number of springs that may be preformed and heat-treated in a single fixture, thereby appreciably reducing the cost of fabricating seismometer spider springs from several sheets preformed simultaneously in a single fixture.

It is yet another object of the invention to improve the accuracy and consistency in the preforming process for spider springs.

SUMMARY OF THE INVENTION

In accordance with the method of this invention, at least one sheet containing the spider springs, while the springs remain connected to the body of the sheet by tie tabs, is positioned in a novel preform fixture having internal parts constructed to simultaneously permanently preform each spring after the fixture is heat treated. Several sheets can be stacked, one on top of the other, in an indexed manner in the preform fixture, thereby allowing the simultaneous preforming of several hundred spider springs in an economical, consistent, and efficient manner.

After the individual sheets are removed from the preforming fixture, the springs while still on the sheets can be spot measured and graded or they can be simultaneously measured and graded, depending on the accuracy required. On the other hand, the sheets removed from the preforming fixture can be first plated, measured and graded, and then severed into individual spider springs. As a result, the novel process can mass produce accurately and consistently preformed spider springs with a minimum of hand manipulations and a minimum of resulting damage to the springs.

The novel fixture for carrying out the preforming process of the invention on an etched sheet comprises a base plate having a flat surface and a number of columns extending vertically upwardly from the flat surface. The number of columns is equal to the number of springs on the sheet, and their disposition on the base corresponds to the disposition of the inner rings on the sheet. The outside diameter of a column is substantially equal to the outside diameter of an inner ring.

An intermediate plate is provided having bottom and top flat surfaces and defining a number of transverse bores equal to the number of columns. The diameter of each bore is substantially equal to the inside diameter of each outer ring so that the center of each column is also the center of each bore when the bottom surface of the intermediate plate is disposed on top of the base plate. A compression plate having a bottom flat surface is disposed over the top flat surface of the intermediate plate.

In use, the beryllium copper sheet with its etched out spider springs, which are still maintained on the sheet by tie tabs, is disposed between the base and the intermediate plates so that the inner ring is clamped between the column and the bottom face of the compression plate, and the outer ring is clamped between the base and the bottom surface of the intermediate plate. By making the height of each column equal to the thickness of the intermediate plate, which is equal to the desired preform, all the springs become accurately and simultaneously preformed after the preform fixture holding the etched sheet is heat treated.

DESCRIPTION OF THE METHOD OF THE INVENTION

Figure 1:
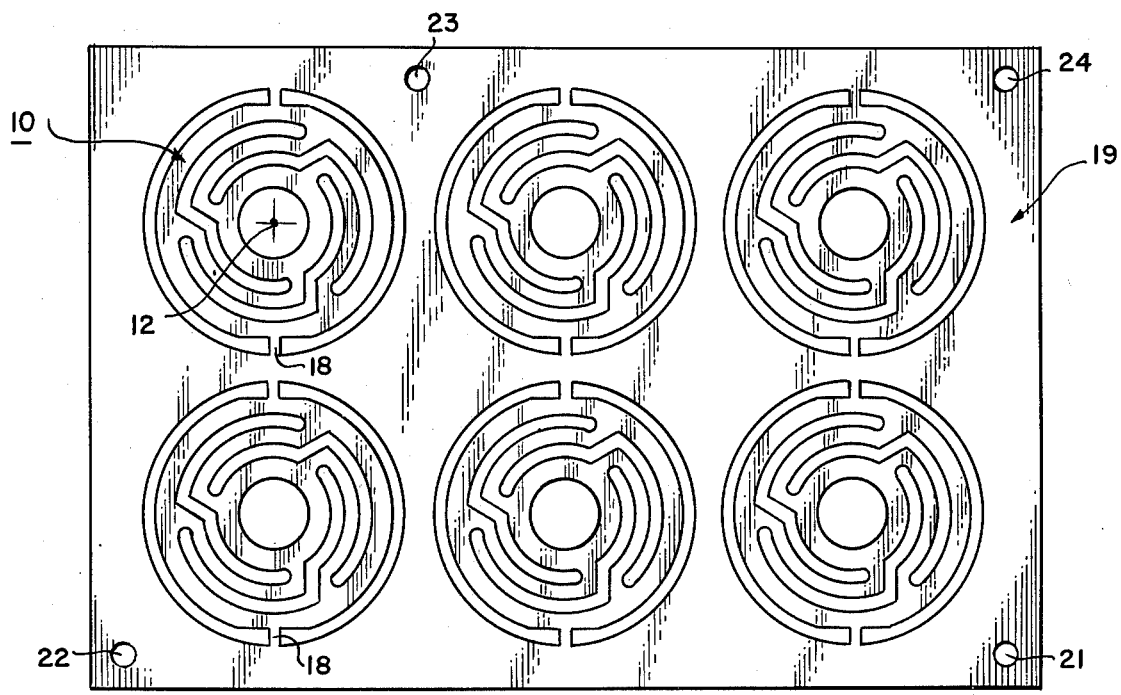
FIG. 1 is a plan view of a sheet containing rows of spider springs.
Figure 1A:
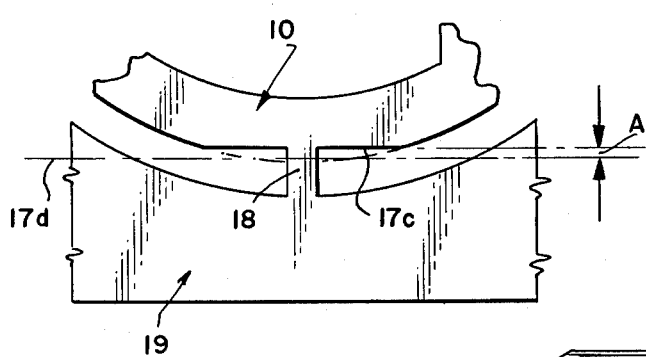
FIG. 1A is a fragmentary enlargement of a tie tab connecting each spring to the body of the sheet.

Throughout the drawings the same reference characters will designate the same parts. Similar parts are designated with the same reference characters followed by a prime (').

With particular reference now to FIGS. 1, 1A, 4 and 5 the spider springs, generally designated as 10, are etched out from a sheet 19 typically made of a beryllium copper alloy and having a uniform thickness of about four mils. The outside diameter of a spider spring may range between 0.75 to 1.25 inches. A common diameter is $\frac{7}{8}$ inches.

In a preferred embodiment, sheet 19 includes 6 rows, each containing 10 springs. To simplify the drawing, only two such rows are shown, each containing three springs. The number of springs per sheet may range from 50 to 100 or more. Since all the springs are identical and are oriented in the same direction relative to the edges of rectangular sheet 19, only one such spring 10 will be described in detail.

Figure 4:
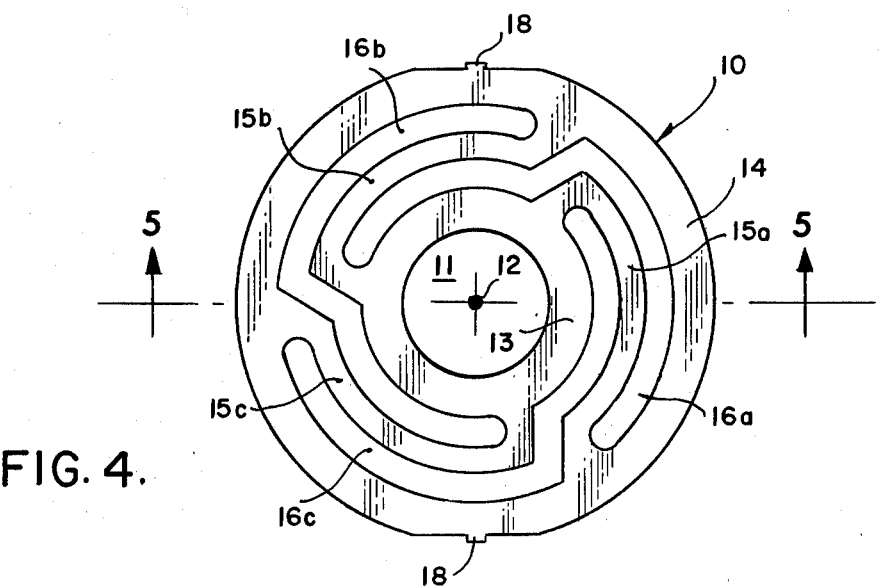
FIG. 4 is a plan view of an individual spider spring cut out from the sheet shown in FIG. 1.
Figure 5:
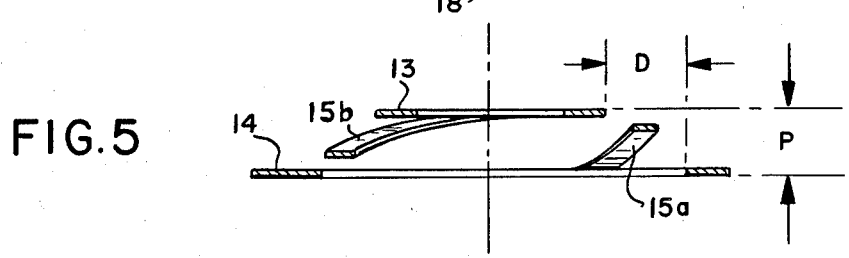
FIG. 5 is a sectional view taken on line 5—5 of FIG. 4.

As shown in FIG. 4, spider spring 10 is generally circular and has a center 12, a center hole 11, an inner ring 13 next to hole 11, and an outer ring 14 at the rim. Three involute grooves 16a–16c, angularly and symmetrically spaced from each other in partially overlapping relationship, define therebetween three involute flat ribbons or arms 15a–15c, respectively. Each arm connects the outer ring with the inner ring. Such connections with the inner ring are angularly spaced from each other symmetrically about the center 12. The arcuate arms 15a–15c allow the inner and outer rings 13 and 14 to move axially relative to each other by flexing the spring arms. The distance between the outer diameter of the inner ring 13 and the inner diameter of the outer ring 14 is D (FIG. 5). A finished spider has a preform, i.e., a permanent displacement P between the inner ring 13 and the outer ring 14. The distance P by which the inner and outer rings are axially displaced is determined by the physical characteristics of the geophone utilizing the springs.

When the weight of the coil-mass assembly in the geophone is suspended from a pair of outer rings 14, it will deflect the inner rings 13 until they become substantially flat, as shown in FIG. 4. Thus, in a geophone a pair of spider springs 10 can support either the coil-mass assembly or the permanent magnet assembly, so that one can move relative to the other to produce an output seismic signal proportional to the vibration imparted to the case of the geophone.

Each spring 10 is etched out from the sheet of beryllium copper 19, but each spring is still allowed to remain attached to the sheet by a pair of diametrically-opposed, properly oriented tie tabs 18. Thus, each spring is tied to the body of sheet 19 by a pair of tabs 18 of very little mass. To align and index sheet 19 within a preforming fixture, generally designated as 20 (FIG. 2), there are provided four holes 21–24. Hole 23 is also an indexing hole so that all the sheets which may be simultaneously loaded into the preforming fixture 20 are correctly loaded, so that each vertical stack of springs will have the same orientation for their arms 15a–15c. When a sheet 19 is disposed inside preforming fixture 20, all the inner annular rings 13 will be axially displaced relative to the outer rings 14 by the distance P.

Figure 6:
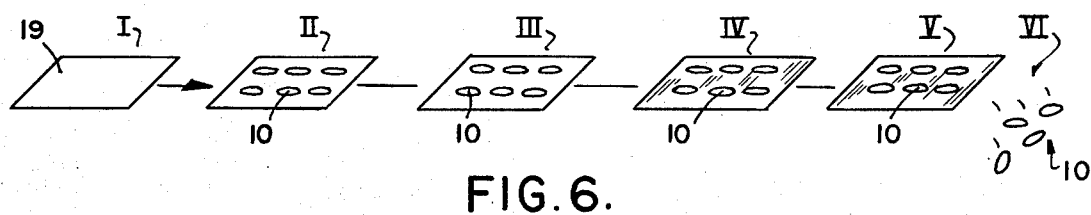
FIG. 6 illustrates the steps commonly employed to carry out the method of the present invention.

With reference to FIG. 6, the process of fabricating preformed springs involves moving a sheet 19 through an etching station I. The sheet exits from the etching station with the spider springs 10 etched out as shown in FIG. 1. Sheet 19 is then placed in a preforming fixture 20 at a preforming station III. Inside fixture 20 the inner ring 13 becomes displaced from the outer ring 14 by a distance P. To make that displacement permanent and to relieve the stresses induced into the spring by the forced displacement between the inner and outer rings, fixture 20 is heat treated at the preforming station III. When the fixture is opened and sheet 19 is removed therefrom, each spring, when in a free condition, will have its inner ring permanently axially displaced from the outer ring by the distance P.

If required, the preformed sheet 19 is moved through a plating station IV wherein the entire sheet is plated with a suitable conductive material, such as gold, silver or a suitable alloy. The electroplated, preformed sheet 19 is then moved to a measuring and grading station V in which either all of the springs 10 or selected ones are spot checked. If sheet 19 is found acceptable, its springs 10 are severed at a shearing station VI by first cutting out rows of springs at cut lines 17d (FIG. 1A) across tie tabs 18 that project outwardly from a flattened portion 17c on the outer circumference of the outer ring 14. Then each row is cut into individual springs 10. It is only after the springs are preformed, plated, measured and graded, and finally severed from the sheets that they are hand manipulated for the purpose of suspending the two assemblies of the geophone. In this manner, accurate preformed springs are consistently obtained in large quantities as a result of stacking and indexing one or more sheets 19 (FIG. 1) in a preforming fixture (20).

The fixture 20 for carrying out the method of this invention comprises a base plate 31 having a top surface 31a from which vertically extend a plurality of columns 25 and four aligning rods 21'-24'. Rod 23' serves as an indexing rod. All columns 25 are equal, each having a top surface 25a whose diameter is equal to the outer diameter of inner ring 13. Thus, when a spring 10 is concentrically disposed on top 25a of column 25, the inner ring 13 will rest on an annular portion of the top surface 25a, and column 25 cannot go through hole 11 in spring 10. If desired, column 25 can have an axial bore whose diameter should not exceed the diameter of hole 11.

Figure 2:
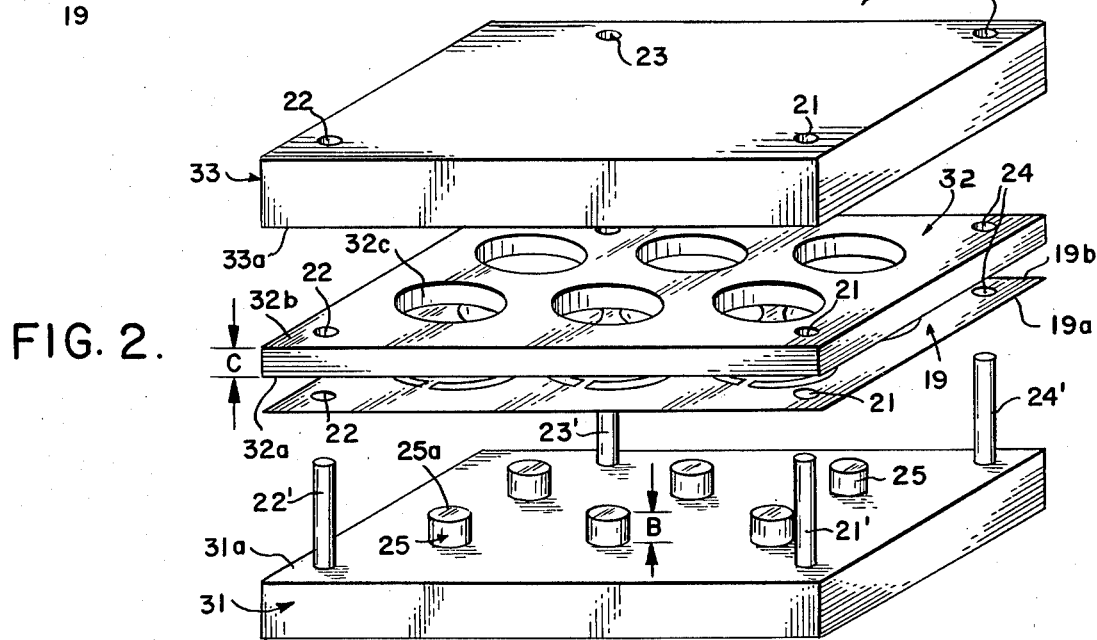
FIG. 2 is an exploded view of the preforming fixture shown loaded with the sheet of FIG. 1.

Sheet 19 has a lower surface 19a and a top surface 19b (FIG. 2). When the sheet is lowered down the aligning rods 21'-24', the bottom surfaces 19a of the annular inner rings 13 will rest on the top surfaces 25a of columns 20. On top of the upper surface 19b of sheet 19 is positioned a clamping plate 32 having a bottom flat surface 32a and a top flat surface 32b. Plate 32 has aligning holes 21-24 and a plurality of bores 32c, each having a diameter equal to the inner diameter of annular outer ring 14. Bores 32c are concentric with columns 25. The thickness C (FIG. 2) of clamping plate 32 is made equal to the height B of the column 25, and C is approximately 10% larger than the desired preform P to compensate for shrinkage.

Disposed on top of plate 32 is a pressure plate 33 having a bottom flat surface 33a and four aligning holes 21-24.

Figure 3:
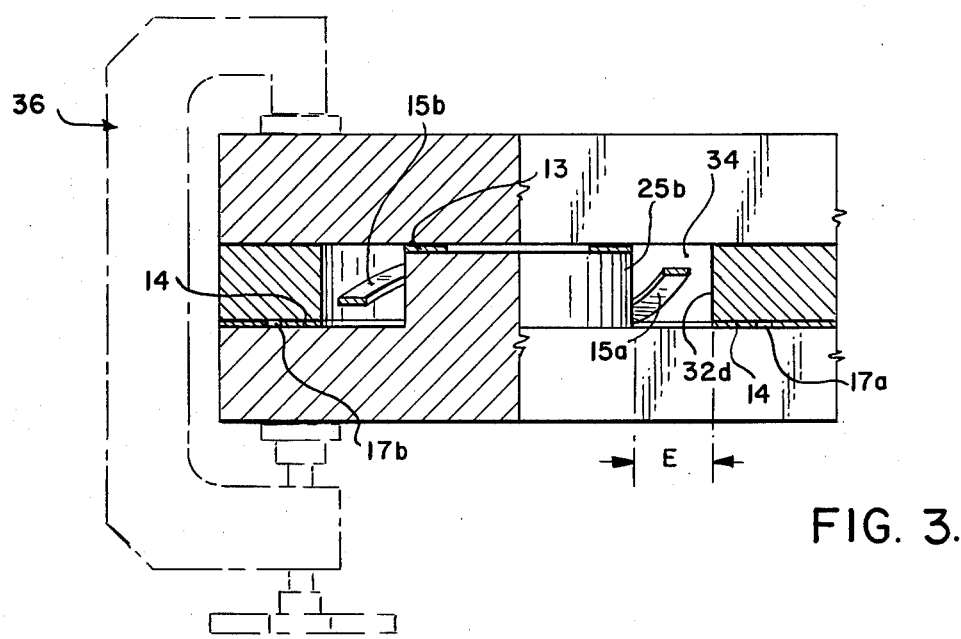
FIG. 3 is a fragmentary, partially sectional view of one column and one spring in the closed preforming fixture.

When the fixture 20 is closed, as shown in FIGS. 2 and 3, the plates 31, 32 and 33 can be clamped together, for example, by C-clamps 36. The position of sheet 19 inside the fixture is shown in FIG. 3. It will be noted that the annular inner rings 13 are clamped between the tops 25a of columns 25 and the bottom surface 33a of pressure plate 33. The annular outer rings 14 are clamped between the bottom surface 32a of clamping plate 32 and the top surface 31a of base plate 31. The arms 15a–15c are freely disposed inside the annular chamber 34 formed between the external cylindrical surface 25b of column 25 and the cylindrical wall 32d of bore 32c.

After fixture 20 is heat treated, as above described, and opened to remove preformed sheet 19, each spring will have its inner ring 13 axially displaced relative to its outer ring 14 by the preform distance P.

While the invention has been described in connection with loading one sheet 19 into fixture 20, in practice between 10 and 15 such sheets can be loaded into the fixture, each containing between 60 to 100 springs 10.

While the invention has been described with reference to particular steps and fixture embodiments, it will be appreciated by those skilled in the art that variations therein are possible without departing from the scope of the attached claims.

What I claim is:

1. A method of preforming at least one sheet containing a plurality of seismometer spider springs, while the springs remain connected to the body of the sheet by tie tabs, comprising:
    positioning the sheet in a preform fixture having internal parts constructed to simultaneously displace each inner ring of each spring relative to its outer ring by a predetermined distance; and
    heat treating the fixture with the sheet therein, thereby causing the simultaneous preforming of the spider springs whereby each inner ring is permanently displaced from its outer ring.

2. The method of claim 1 and, while the preformed springs are still on the sheet, measuring the preform of the springs.

3. The method of claim 1 and, while the preformed springs are still on the sheet, plating the sheet with a conductive material.

4. The method of claim 1 wherein said tie tabs are diametrically opposed thereby facilitating the shearing of the springs from the sheet.

5. The method of claim 1 and etching into the sheet indexing and aligning holes before the sheet is loaded into the preform fixture.

6. A method of fabricating seismometer spider springs, comprising:
    cutting out from a sheet of conductive metal a plurality of spider springs, each spring having an inner ring, an outer ring, and a plurality of arms interconnecting the inner and outer rings, and each outer ring remaining connected to the body of the sheet by tie tabs, and said sheet having a plurality of aligning and indexing holes;
    positioning the sheet in a fixture having internal parts constructed to simultaneously displace each inner ring of each spring relative to its outer ring by a fixed predetermined distance; and
    heat treating the fixture with the sheet therein, thereby causing the simultaneous preforming of the spider springs.

* * * * *